(12) United States Patent
McClendon

(10) Patent No.: US 7,677,243 B2
(45) Date of Patent: Mar. 16, 2010

(54) SOLAR HEATING SYSTEM AND ARCHITECTURAL STRUCTURE WITH A SOLAR HEATING SYSTEM

(75) Inventor: James Patrick McClendon, Bella Vista, AR (US)

(73) Assignee: Wal-Mart Stores, Inc., Bentonville, AR (US)

( * ) Notice: Subject to any disclaimer, the term of this patent is extended or adjusted under 35 U.S.C. 154(b) by 0 days.

(21) Appl. No.: 11/625,662

(22) Filed: Jan. 22, 2007

(65) Prior Publication Data

US 2008/0176504 A1 Jul. 24, 2008

(51) Int. Cl.
*F24J 3/02* (2006.01)
*F24J 2/00* (2006.01)

(52) U.S. Cl. .............. 126/621; 126/646; 126/653; 126/628; 126/655; 126/597; 454/254

(58) Field of Classification Search .............. 126/646, 126/643, 621, 628, 623, 655, 674, 704, 706, 126/710, 428, 429; 136/246, 430
See application file for complete search history.

(56) References Cited

U.S. PATENT DOCUMENTS

| | | | |
|---|---|---|---|
| 1,562,790 A | 11/1925 | Rockburg | |
| 2,595,905 A | 5/1952 | Telkes | |
| 3,960,135 A | 6/1976 | Angilletta | |
| 3,971,359 A | 7/1976 | Bourne | |
| 3,981,294 A | 9/1976 | Deminet et al. | |
| 3,985,116 A | 10/1976 | Kapany | |
| 3,994,276 A | 11/1976 | Pulver | |
| 3,996,759 A | 12/1976 | Meckler | |
| 3,996,919 A | 12/1976 | Hepp | |
| 4,016,861 A | 4/1977 | Taylor | |
| 4,018,211 A | 4/1977 | Barr | |
| 4,019,494 A | 4/1977 | Safdari | |
| 4,020,827 A | 5/1977 | Broberg | |
| 4,046,133 A | 9/1977 | Cook | |
| 4,054,125 A | 10/1977 | Eckels | |
| 4,058,109 A | 11/1977 | Gramm | |

(Continued)

FOREIGN PATENT DOCUMENTS

CA 1196825 A 11/1985

(Continued)

*Primary Examiner*—Steven B McAllister
*Assistant Examiner*—Nikhil Mashruwala
(74) *Attorney, Agent, or Firm*—Wood, Herron & Evans, LLP

(57) ABSTRACT

A solar heating system for a building and other architectural structures including a solar heating system. The solar heating system comprises a solar heating module with an enclosure of panels bounding a plenum. An interior panel is disposed inside the enclosure. A collector panel, which is separated from the interior panel to define a heating chamber, is exposed to, and heated by, solar radiation. Outside air enters the heating chamber though passages in the collector panel, where the air is heated by heat transferred from the collector panel. An air-moving device is coupled with an air outlet from the plenum. The air-moving device applies a negative pressure in the heating chamber effective for drawing the outside air through the passages into the heating chamber and for withdrawing the heated air from the heating chamber through a delivery opening to the plenum for subsequent removal through the air outlet.

26 Claims, 6 Drawing Sheets

U.S. PATENT DOCUMENTS

| | | | |
|---|---|---|---|
| 4,064,868 A | | 12/1977 | Nussbaum |
| 4,085,731 A | | 4/1978 | Weir |
| 4,088,117 A | | 5/1978 | Keyes |
| 4,092,978 A | | 6/1978 | Levine |
| 4,098,262 A | | 7/1978 | Peters |
| 4,099,338 A | | 7/1978 | Mullin et al. |
| 4,103,825 A | | 8/1978 | Zornig |
| 4,106,483 A | | 8/1978 | Barber, Jr. |
| 4,111,183 A | | 9/1978 | Haberthier |
| 4,111,188 A | | 9/1978 | Murphy, Jr. |
| 4,121,565 A | | 10/1978 | Grisbrook |
| 4,126,270 A | | 11/1978 | Hummel |
| 4,128,124 A | | 12/1978 | Worthington |
| 4,131,158 A | | 12/1978 | Abhat et al. |
| 4,137,898 A | | 2/1979 | Koizumi et al. |
| 4,144,871 A | | 3/1979 | Porter |
| 4,151,954 A | | 5/1979 | Jacobs |
| 4,162,671 A | | 7/1979 | Christy |
| 4,183,350 A | | 1/1980 | Staudacher |
| 4,197,993 A | | 4/1980 | Trombe et al. |
| 4,211,213 A | | 7/1980 | Nissen et al. |
| 4,215,677 A | | 8/1980 | Erickson |
| 4,221,059 A | | 9/1980 | Everitt |
| 4,226,226 A | * | 10/1980 | Knoos ................. 126/666 |
| 4,237,865 A | | 12/1980 | Lorenz |
| 4,257,396 A | | 3/1981 | Reinert |
| 4,273,100 A | | 6/1981 | Cogliano |
| 4,296,736 A | | 10/1981 | Soot |
| 4,297,990 A | * | 11/1981 | Allisbaugh ............. 126/667 |
| 4,323,053 A | | 4/1982 | McCullough et al. |
| 4,324,289 A | * | 4/1982 | Lahti ..................... 165/48.2 |
| 4,327,708 A | | 5/1982 | Taylor |
| 4,403,600 A | | 9/1983 | Morrison et al. |
| 4,442,827 A | | 4/1984 | Helman et al. |
| 4,471,758 A | | 9/1984 | Jennings |
| 4,471,761 A | | 9/1984 | Pearson et al. |
| 4,498,458 A | | 2/1985 | Soper |
| 4,774,932 A | | 10/1988 | Hollick |
| 4,899,728 A | | 2/1990 | Peter et al. |
| 4,934,338 A | * | 6/1990 | Hollick et al. ............. 126/622 |
| 5,596,981 A | | 1/1997 | Soucy |
| 5,692,491 A | | 12/1997 | Christensen et al. |
| 5,931,157 A | | 8/1999 | Aschauer |
| 5,935,343 A | | 8/1999 | Hollick |
| 6,792,938 B2 | * | 9/2004 | Komano et al. ............. 126/597 |
| 6,807,963 B1 | | 10/2004 | Niedermeyer |
| 6,912,816 B2 | | 7/2005 | O'Leary |
| 6,922,908 B1 | | 8/2005 | Raudales |
| 7,032,588 B2 | | 4/2006 | Hollick |
| 7,077,124 B2 | | 7/2006 | Szymocha |
| 2002/0117166 A1 | * | 8/2002 | Okumura ................. 126/633 |
| 2003/0131623 A1 | | 7/2003 | Suppes |
| 2005/0061312 A1 | | 3/2005 | Szymocha |
| 2005/0252507 A1 | * | 11/2005 | Hollick ..................... 126/621 |

FOREIGN PATENT DOCUMENTS

| | | |
|---|---|---|
| DE | 19820156 A | 11/1999 |
| EP | 1462735 A | 9/2004 |

* cited by examiner

US 7,677,243 B2

SOLAR HEATING SYSTEM AND ARCHITECTURAL STRUCTURE WITH A SOLAR HEATING SYSTEM

FIELD OF THE INVENTION

The invention generally relates to solar heating devices and, more particularly, relates to solar heating systems and architectural structures with solar heating systems.

BACKGROUND OF THE INVENTION

Solar heating harnesses solar radiation emitted by the sun to provide solar thermal energy for various different domestic and commercial uses including solar hot water, solar space heating, and solar pool heaters. Among their attributes, solar heating systems conserve energy, reduce utility costs, and produce clean energy. Generally, solar heating systems convert solar radiation into usable or sensible heat. To that end, many conventional solar heating systems utilize a large area collector for absorbing heat from the solar radiation. The absorbed sensible heat is transferred to a fluid, which is subsequently transferred to the ventilated space inside a building.

Conventional solar heating systems may be integrated as a cladding directly into a southern-facing side wall of the building. However, the orientation of the southern-facing side wall of building established during construction of building may not be optimized to orient the collector relative to the track of the sun across the sky during daylight hours. Such conventional solar heating systems are also problematic if the southern-facing side wall is used as a building entrance, a loading dock, etc.

Tall buildings tend to derive the most benefit from such conventional solar heating devices. In particular, the surface area of the southern-facing wall increases with the height of the building. Although shorter buildings may lack a large-area southern-facing wall, their roofs may have a substantial surface area that cannot be effectively utilized by conventional solar heating systems.

What is needed, therefore, are solar heating systems and modules that are self-contained for versatility in application to supplying heated ventilation air to buildings.

SUMMARY OF THE INVENTION

In one embodiment, a solar heating system is provided for a building. The solar heating system comprises a solar heating module with an enclosure including a plurality of panels arranged to bound a plenum. Included among the panels are an interior panel disposed inside the enclosure and a collector panel separated from the interior panel to define a heating chamber. The heating chamber is coupled in fluid communication with the plenum by a delivery opening. The collector panel includes a plurality of passages establishing fluid communication between an ambient environment of the enclosure and the heating chamber. The panels of the enclosure having an arrangement such that the collector panel is capable of being exposed to solar radiation and heated by the solar radiation. The collector panel is configured to transfer heat to air communicated from the ambient environment to the heating chamber through the passages to form heated air. An air outlet from the plenum is defined in one of the panels of the enclosure. An air-moving device is coupled with the air outlet. The air-moving device is adapted to apply a negative pressure in the heating chamber effective for drawing the air from the ambient environment through the passages into the heating chamber and for withdrawing the heated air from the heating chamber through the delivery opening to the plenum for subsequent removal through the air outlet.

BRIEF DESCRIPTION OF THE DRAWINGS

The accompanying drawings, which are incorporated in and constitute a part of this specification, illustrate embodiments of the invention and, together with a general description of the invention given above and the detailed description of the embodiments given below, serve to explain the principles of the invention.

DETAILED DESCRIPTION

Figure 1:
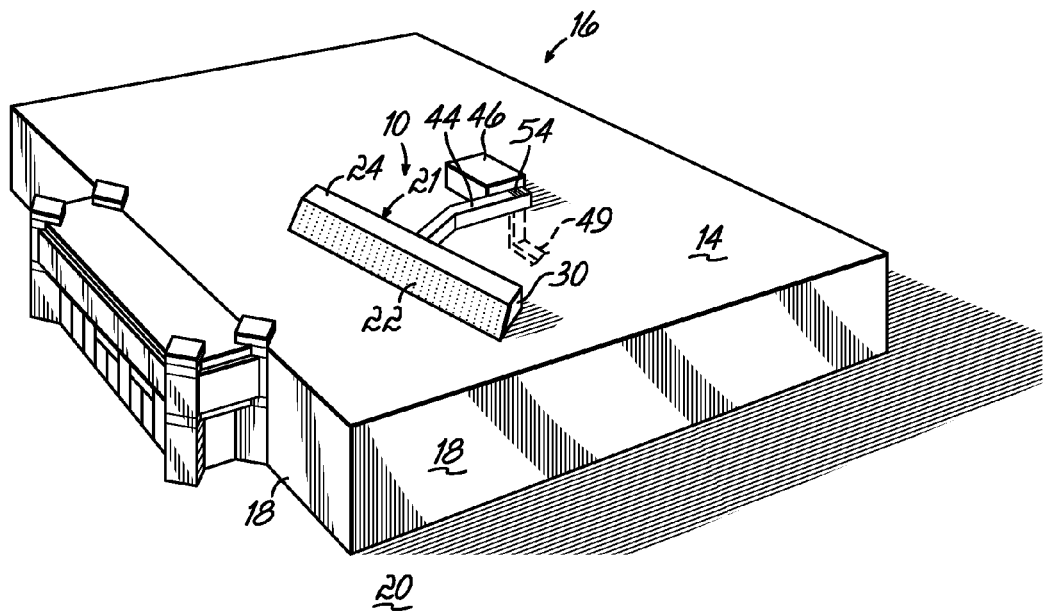
FIG. 1 is a perspective view of a solar heating module of an embodiment of the invention in which the solar heating module is mounted on a roof of a building and coupled with a HVAC unit associated with the building.

With reference to FIG. 1, a solar heating module 10 is situated on a roof 14 of a building 16. The roof 14 may have a substantially greater surface area than exterior side walls 18 of the building 16 that extend from roof 14 to a ground surface 20 and encircle the perimeter of the building 16. The roof 14 is represented as substantially flat and planar, although the roof 14 may also be pitched or otherwise non-planar to, for example, promote water drainage. The side walls 18 may incorporate a building entrance, a loading dock, windows, etc. The solar heating module 10 may be secured to the roof 14 using a conventional method known to a person having ordinary skill in the art. The space enclosed by the roof 14 and side walls 18 of building 16 may be used, for example, to conduct commercial activities, such as retail product sales, and other activities apparent to a person having ordinary skill in the art. Alternatively, the space enclosed inside building 16 may be used for non-commercial or residential purposes, such as living space. The primary contribution of the roof 14 of building 16 is to operate as a physical platform on which to support the solar heating module 10.

The solar heating module 10 comprises a constituent component of a solar heating system used for heating ventilation air supplied to the building 16. In alternative embodiments of the invention, the solar heating system may include multiple solar heating modules (not shown) each substantially identical to solar heating module 10.

With reference to FIGS. 1, 1A, 2, and 3, the solar heating module 10 includes an enclosure 21 bounded by a collector panel 22, a top panel 24, a floor panel 28 proximate to roof 14, a rear panel 26 extending between the top panel 24 and floor panel 28, and end panels 30, 31 capping the openings at the opposite ends of the coupled panels 22, 24, 26, 28. The panels 22, 24, 26, 28, 30, 31, which may be formed from thin sheets of a metal like aluminum, are supported by a frame 32. The frame 32 may consist of interconnected horizontal and vertical structural beams of, for example, aluminum extrusions. Alternatively, the frame 32 may comprise other lightweight materials, such as other metals, fiberglass, or composites, and other shapes, including but not limited to rectangular, square, or angled. The enclosure 21 bounded by panels 22, 24, 26, 28, 30, 31 defines a plenum 34. The enclosure 21 of the solar heating module 10 may have a significantly greater length than height (i.e., an aspect ratio of length to height substantially less than one) so that the projection of module 10 relative to roof 14 is limited.

In various alternative embodiments, additional or fewer panels than panels 22, 24, 26, 28, 30, 31 may be included in the construction of the enclosure 21. For example, the top panel 24 may be omitted such that the collector panel 22 converges with the rear panel 26 to define an angled apex. As another example, the top panel 24 may be extended in width such that the top and bottom panels 24, 26 have approximately equal dimensions and the collector panel 22 is oriented substantially vertical relative to the roof 14. As yet another example, the collector panel 22 may be made non-planar by shaping the sheet to define connected sub-panels with adjacent edges that join at corners and that are inclined relative to each other in a faceted configuration.

The collector panel 22 includes an exterior surface 36, an interior surface 38, and passages 40 extending between the exterior and interior surfaces 36, 38. The collector panel 22 may comprise a substantially flat, planar sheet, as shown, or may be alternatively contoured. The collector panel 22 extends between the top and floor panels 24, 26 in an inclined relationship relative to the rear panel 26. The angle of inclination, θ, which may be measured between the plane of the collector panel 22 and the plane of floor panel 28, is generally selected as a function of location on roof 14, orientation of the collector panel 22 relative to the track of the sun, and the particular application for the solar heating module 10.

The enclosure 21 further includes an interior panel 35 disposed inside the plenum 34. The interior panel 35 extends between the end panels 30, 31 and, along with the collector panel 22, defines a heating chamber 37 between the interior surface 38 of the collector panel 22 and a surface 39 of the interior panel 35 that confronts the interior surface 38. The exterior surface 36 of the collector panel 22 is exposed to ambient or outside air (and solar radiation) and the interior surface 38 of the collector panel 22 is contiguous with the air space inside the heating chamber 37.

The separation between the panels 22, 35 determines the depth of the heating chamber 37. Generally, the depth of the heating chamber 37 is function of factors like the specific location on roof 14, orientation of the collector panel 22 relative to the track of the sun, and the particular application for the solar heating module 10. The passages 40, which penetrate through the thickness of the collector panel 22, define air inlet openings to allow outside air from the ambient environment to enter the heating chamber 37. The passages 40 establish communication for fluid flow of outside air from the ambient environment of the enclosure 21 to the heating chamber 37.

One end of the interior panel 35 is separated from the top panel 24 by a gap that defines a delivery slot 41 through which air, after heating in the heating chamber 37, is transferred from the heating chamber 37 to the plenum 34. The delivery slot 41 is sized by adjusting the open area of the gap and, therefore, the degree of separation between the top panel 23 and the free end of the interior panel 35. This sizing establishes an equal static pressure region along the plenum 34, which is equal to the calculated velocity through the heating chamber 37 independent of the size of the plenum 34. An opposite end of the interior panel 35 contacts the floor panel 28 so that the heating chamber 37 only communicates with the plenum 34 through the delivery slot 41.

An air outlet 42, which is defined in the rear panel 26 of the enclosure 21, is coupled with a tubular duct 44 that extends across the roof 14 to the air handling unit of a heating, ventilation and air conditioning (HVAC) unit 46. The HVAC unit 46 supplies cooled ventilation air and heated ventilation air to the ventilated space inside the building 16. A fan or blower 48, which may have variable speeds for changing the flow rate, inside the tubular duct 44 communicates with the air outlet 42. The blower 48 operates as an air-moving device for moving or forcing heated air from the plenum 34 to the HVAC unit 46. As heated air is displaced or removed from the plenum 34 through the air outlet 42, outside air is drawn through the passages 40 into the heating chamber 37. The blower 48 creates a region of reduced pressure within the plenum 34 and the heating chamber 37 so that a pressure differential exists between the exterior and interior surfaces 36, 38 of the collector 22. The air pressure differential between the ambient environment outside of the collector 22 and inside the heating chamber 37 draws outside air at ambient temperature into the heating chamber 37 through passages 40 to replace the heated air removed from the plenum 34. In this manner, the solar heating module 10 continuously operates to generate heated air when the blower 48 is powered and operating to evacuate the plenum 34 and heating chamber 37 to a sub-atmospheric pressure.

Figure 1A:
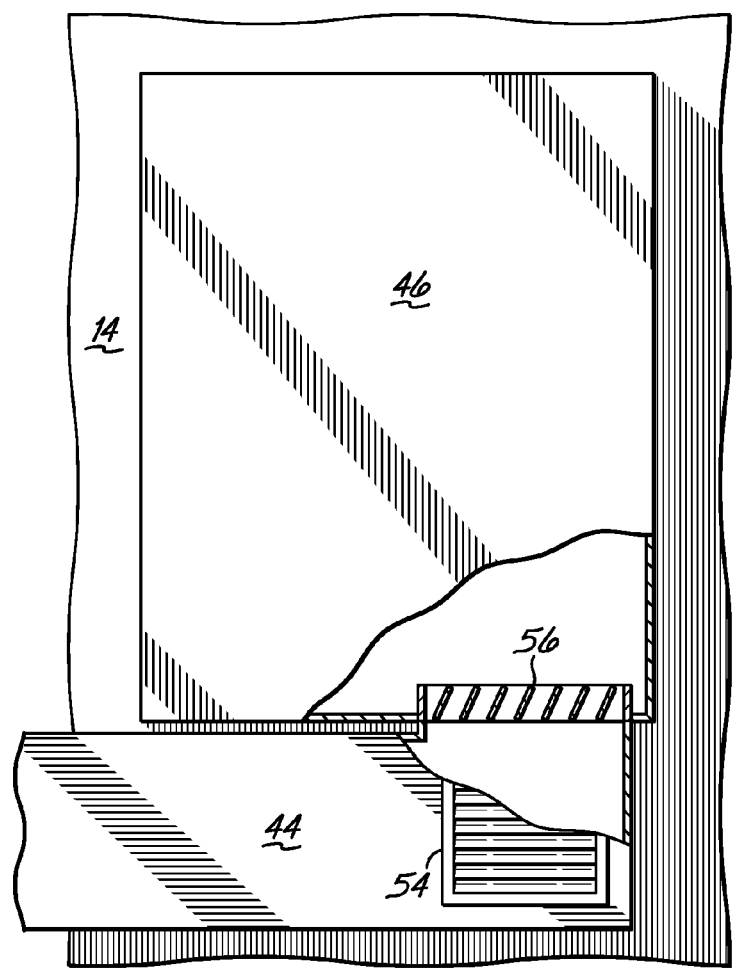
FIG. 1A is a cross-sectional view of a portion of the HVAC unit of FIG. 1 taken near the point of connection between the HVAC unit and the solar heating module.

A damper 54 in duct 44 is operated to permit the interior of duct 44 to selectively communicate with the ambient environment. Duct 44 is coupled in fluid communication with an air inlet 45 to define a point of connection with the HVAC unit 46. Installed in the air inlet 45 at or near the point of connection is a damper 56 (FIG. 1A). If the duct 44 were not coupled with the air inlet 45, the HVAC unit 46 would rely on the damper 56 to draw in outside air from the ambient environment at ambient temperature. The dampers 54, 56 may include a plurality of individual vanes that are moved between open and closed positions by a damper motor. Adjacent vanes of the dampers 54, 56 overlap or abut when moved to a closed position to present a substantially solid surface that obstructs air flow. When moved to an open position, adjacent vanes of the dampers 54, 56 are separated by a gap for air flow.

The air handling unit of the HVAC unit 46 is coupled with vented ducts 49 that extend inside the building 16. These vented ducts 49, which are typically overhead ducts suspended from the ceiling above the ventilated space, distribute heated air (and also cooled air in periods without a heating demand) output from the HVAC unit 46 to the ventilated space inside building 16. The construction of the HVAC unit 46 is understood by a person having ordinary skill in the art. For example, the HVAC unit 46 may include a gas or electric heating device, or a heat pump, for further elevating the temperature of the heated air received from the solar heating module 10, a blower, an air cooling device, a filter, etc. The HVAC unit 46 may be newly added to building 16 along with solar heating module 10 or an existing device that is retrofitted with the solar heating module 10.

During periods with a heating demand, damper 54 is closed to seal the duct 44 and damper 56 is opened to open the air inlet 45 to the HVAC unit 46, as best shown in FIG. 1A. With the dampers 54, 56 in this condition, a forced flow of heated air is promoted through the duct 44 from the solar heating module 10 to the air inlet 45 of HVAC unit 46. If only partially opened, the damper 56 may used to regulate the flow rate of heated air from the solar heating module 10 to the HVAC unit 46. During periods without a heating demand, the blower 48 of the solar heating module 10 is unpowered (i.e., de-energized or idled) to remove the forced flow of heated air to duct 44 from the solar heating module 10. The dampers 54 and 56 are opened so that the blower of the HVAC unit 46 can draw outside air from the ambient environment of enclosure 21 into the air inlet 45 to permit operation when the solar heating module 10 is not operating.

Figure 5:
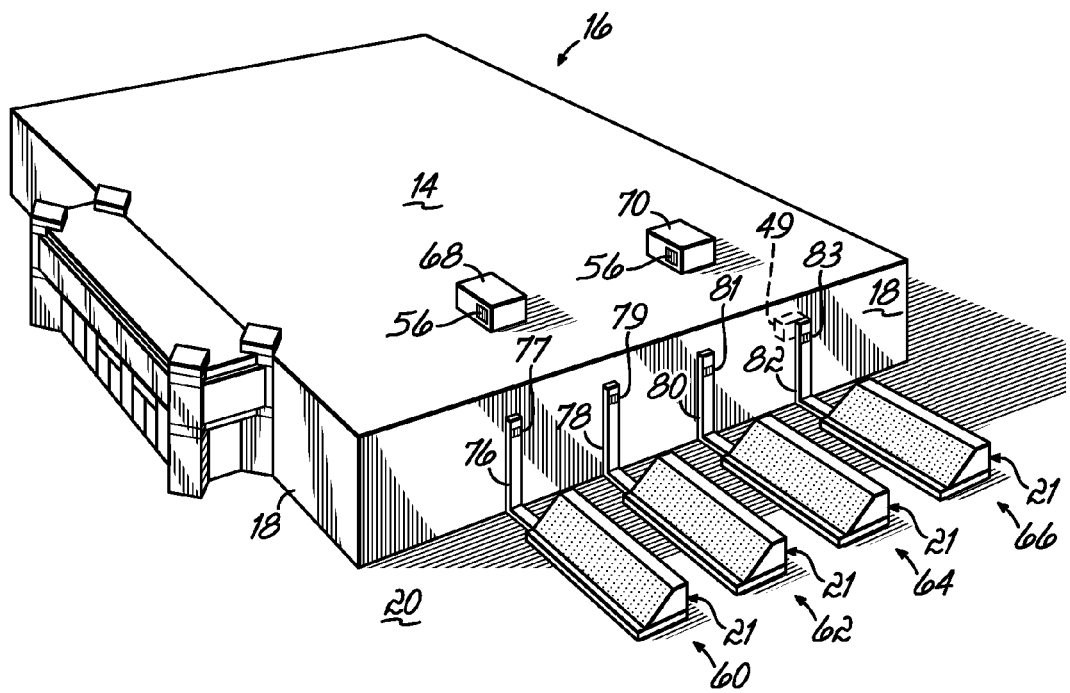
FIG. 5 is a perspective view similar to FIGS. 1 and 4 of solar heating modules in accordance with an alternative embodiment of the invention mounted adjacent to a building.

In an alternative embodiment of the invention, the duct 44 from the solar heating module 10 may be directly coupled with the ducts 49 inside building 16 so that the HVAC unit 46 is bypassed, as shown for example in FIG. 5. Heated air may then be transferred directly from the solar heating module 10 to the vented ducts 49 and discharged from ducts 49 to the ventilated space inside the building 16. In another alternative embodiment of the invention, the duct 44 may be coupled with the HVAC unit 46 so that the damper 56 is not in the flow path leading from the solar heating module 10 to the HVAC unit 46.

A control system (not shown), which is associated with the building 16, includes controls and an automatic temperature control system electrically coupled with the HVAC unit 46, the dampers 54, 56, and the blower 48. The control system is operative for adjusting the operation of at least these components to regulate the air temperature inside the ventilated space of building 16. The control system may consist of thermostats and other electronic circuitry. Among other functionality, the control system may control the operation and speed of blower 48, the operation and speed of the blower of HVAC unit 46, and the dampers motors of dampers 54, 56.

One or more of the panels 24, 26, 28, 30, 31, 35 of the enclosure 21 may be insulated with an insulating sheet or layer 12 constituted by a material having a lower thermal conductivity than the material forming panels 24, 26, 28, 30, 31, 35. The reduced thermal conductivity of the insulating layer 12 reduces heat loss from the heated air in the plenum 34 to the ambient environment. For example, the insulating layer 12 on the floor panel 28 may operate to reduce or prevent heat transfer between roof 14 and floor panel 28.

The exterior surface 36 of collector panel 22 generally faces in the direction of the sun during at least part of the daylight hours so that solar radiation impinges the collector panel 22. The solar heating module 10 is oriented on roof 14 to provide this spatial relationship for establishing a line-of-sight with the sun and promoting irradiance of the collector panel 22 by solar radiation. The collector panel 22 absorbs solar radiation from the sun and converts it to heat energy. The exterior surface 36 may be colored, darkened, or blackened to enhance solar radiation absorption. The net amount of thermal energy that the collector panel 22 can absorb from the solar radiation is limited by the difference between the absorptance, which determines how much energy from the solar radiation is initially absorbed by the collector panel 22, and by the thermal emittance E, which indicates the amount of absorbed energy reradiated from the collector panel 22.

The solar heating module 10 represents an indirect solar heating system in which the solar heat is collected exterior to the building 16 and transferred to the ventilated space inside the building 16.

The surface area of the collector panel 22 can be adjusted to meet the heating requirement for the building 16. The density and dimensions of passages 40 can be adjusted in conjunction with the surface area of the collector panel 22 to vary the heating capacity of the solar heating module 10. The passages 40 may be shaped, for example, as round holes or oval slots in the material of collector panel 22.

The blower 48 is typically sized to meet conductance and air intake requirements for the solar heating module 10. The capacity of the blower 48 is also selected to offset for the duct 44 used to couple the solar heating module 10 with the HVAC unit 46. As a result, there may be substantially no air pressure drop effect to the HVAC unit 46, which may eliminate the need for special requirements and limitations upon an existing HVAC unit 46. As a result, the solar heating module 10 may be connected to an existing HVAC unit 46 or along with a newly installed HVAC unit 46.

The collector panel 22 is not associated with the exterior side walls 18 of the building 16. Instead, the solar heating module 10 is supported on the roof 14, which may have a substantially greater surface area than the exterior side walls 18. As a result, the solar heating module 10 is not constrained to conform in dimensions to a southern-facing side wall 18 of building 16. The solar heating module 10 of the embodiments of the invention may be adapted for use on buildings 16 that lack sufficient surface area on the southern-facing side wall 18 for integrating a conventional solar heating module that relies on the side wall 18 to bound the plenum in which the air is heated. For example, the roof 14 of a one-story building 16 may have a surface area (e.g., 100,000 ft$^2$) that is significantly greater than the surface area (e.g., 10,000 ft$^2$) of any one of the side walls 18.

The solar heating module 10 does not have to be either retrofitted to the southern side wall 18 of the building 16 or incorporated into the southern-facing side wall 18 during construction of the building 16. In particular, the southern-facing side wall 18 of building 16 does not participate in defining the plenum 34 or heating chamber 37 inside the enclosure 21 nor does the southern-facing wall bound either the plenum 34 or heating chamber 37. Instead, the enclosure 21 defining the plenum 34 is entirely bounded by panels 22, 24, 26, 28, 30, 31 and, in particular, the heating chamber 37 is bounded between the collector panel 22 and the interior panel 35. This promotes flexibility in locating the solar heating module 10 in comparison with conventional solar heating module designs.

The flexibility in locating the solar heating module 10 may also be important if, for example, the southern-facing side wall 18 includes a building entrance, a loading dock, etc. The ability to orient the solar heating module 10 on roof 14 may be used to optimize the exposure of the exterior surface 36 of collector panel 22 to solar radiation and the sun's track independent of the orientation of the southern-facing side wall 18 of building 16. The solar heating module 10 may be added to building 16 substantially independent of the building type and construction.

The solar heating module 10 can be fabricated at a remote location and transported fully assembled and in a conventional manner (e.g., trucked) to the site of the building 16. Consequently, the solar heating module 10 is a portable construction that need not be shipped in a disassembled state to the installation site.

In use and with reference to FIGS. 1, 1A, 2, and 3, the solar heating module 10 is located on the roof 14 of building 16 as either a component of an original installation or as a retrofitted component. During at least part of the daylight hours, the exterior surface 36 of the collector panel 22 of the module 10 is exposed to solar radiation and, therefore, heated by solar radiation. Under the influence of the negative pressure established in the plenum 34 and heating chamber 37 by blower 48, outside air is drawn from the ambient environment surrounding the enclosure 21 and proximate to the collector panel into the heating chamber 37 through the passages 40 extending through the collector panel 22. The outside air enters the heating chamber 37 at approximately ambient temperature.

The outside air entering and resident in the enclosure 21 is heated inside the heating chamber 37 by heat transferred from the interior surface 38 of the collector panel 22. The temperature of the heated air is greater than the ambient temperature of the outside air. The heated air is subsequently exhausted or transferred from the heating chamber 37 through the delivery slot 41 to the plenum 34. The heated air is forced from the plenum 34 through duct 44 to the inlet opening 45 of the HVAC unit 46. As the heated air is removed from the plenum 34, fresh outside air is drawn at ambient temperature through the passages 40 into the heating chamber 37.

The HVAC unit 46 may further elevate the temperature of the arriving heated air from the solar heating module 10 (or cool the arriving heated air) and then direct the heated air to the ducts 49 vented to the ventilated space inside the building 16. Alternatively, the heated air may be transferred from the solar heating module 10 directly to the ducts 49 servicing the ventilated space inside the building 16, if duct 44 is routed to bypass the HVAC unit 46. The temperature of the heated air exiting the HVAC unit 46 may be set by the electronic control associated with the building 16.

During periods with a heating demand (e.g., the winter months), the damper 54 is closed. The blower 48 operates to direct heated air from the solar heating module 10 through duct 44 and opened damper 56 into the air inlet 45 of HVAC unit 46. During periods without a heating demand or with a reduced heating demand (e.g., summer months), the damper 54 is opened and the blower 48 is idle so that any heated air generated inside the solar heating module 10 is not transferred through duct 44 to the HVAC unit 46. Instead, outside air is drawn from the ambient environment into the duct 44 through the opened damper 54 and, subsequently, fed through the inlet opening 45 to HVAC unit 46 with the solar heating module 10 bypassed. The solar heating module 10 may include vents (not shown) that are opened to exhaust extraneous heated air and, thereby, prevent overheating.

Figure 3:
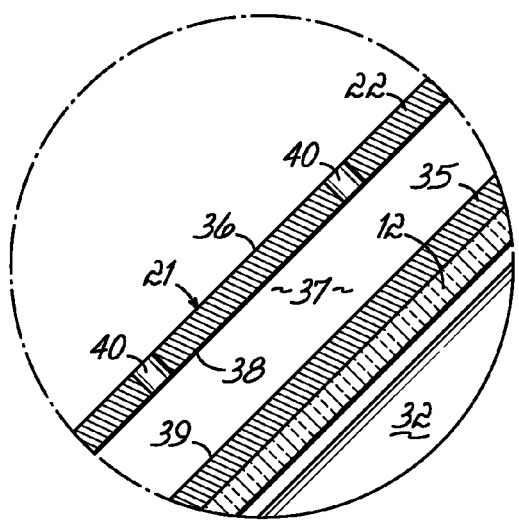
FIG. 3 is a detailed view of a portion of FIG. 2.
Figure 3A:
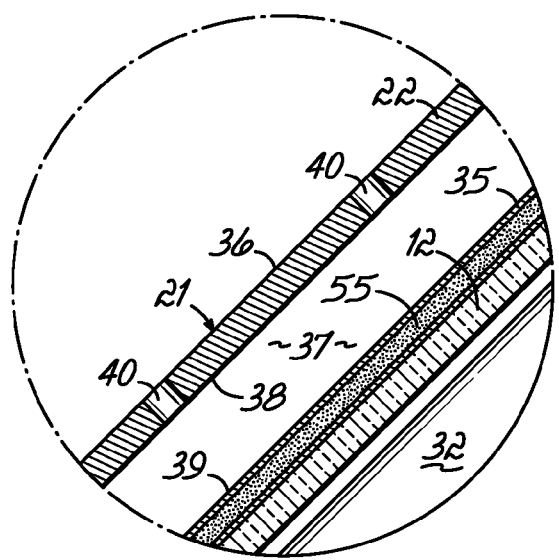
FIG. 3A is a detailed view similar to FIG. 3 in accordance with an alternative embodiment of the invention in which a phase change material is incorporated into the construction of the solar heating module.

With reference to FIG. 3A in which like reference numerals refer to like features in FIG. 3 and in accordance with an alternative embodiment of the invention, the interior panel 35 may optionally comprise, or contain, a phase change material 55 that operates as a thermal storage medium for the solar heating module 10 and solar heating system. The phase change material 55 possesses the ability to change its physical state within a certain temperature range. When the phase change material 55 is heated by the heated air in the heating chamber 37 to its melting temperature, a phase change from a solid to a liquid state occurs. During this melting process, the phase change material 55 absorbs and stores a large amount of latent heat. However, the temperature of the phase change material 55 remains nearly constant during the entire process. When the phase change is complete, continued heating further increases temperature of the molten phase change material as a smaller amount of sensible heat is absorbed from the heated air in the heating chamber 37.

When the phase change material 55 cools because the air temperature in the heating chamber 37 drops, a reverse phase change from the liquid to the solid state occurs that slowly releases the stored latent heat to heat air within the heating chamber 37. This heat transfer maintains the operation of the solar heating module 10 during periods, for example, when solar radiation is not impinging the collector panel 22. During this solidification process, the temperature of the phase change material 55 remains constant. The heat transfer during the melting and solidification processes, both without any temperature change, is responsible for the ability of the phase change material 55 to store heat as an effective thermal storage medium. A person having ordinary skill in the art will appreciate that multiple different substances are available with melting temperatures suitable for use as a phase change material 55 in this embodiment of the invention.

In alternative embodiments of the invention, the number of solar modules may be selected according to the application for the solar heating system. In other alternative embodiments of the invention, the geometry of the enclosure of the solar heating module can be varied to match or optimize the performance of the solar heating module to a particular application for the solar heating system. Exemplary alternative embodiments of these types are described in the subsequent description of FIGS. 4-10.

Figure 2:
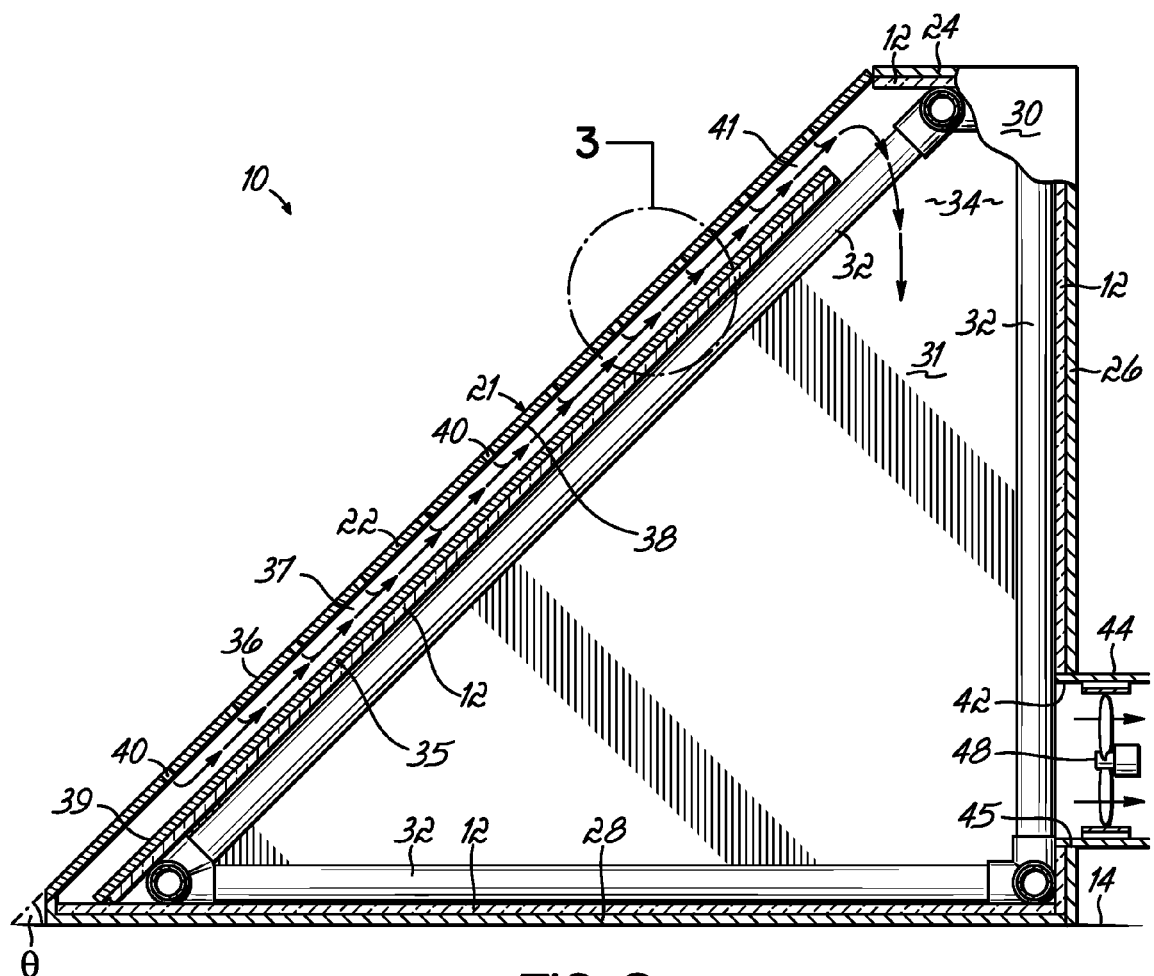
FIG. 2 is a cross-sectional view of the solar heating module of FIG. 1.
Figure 4:
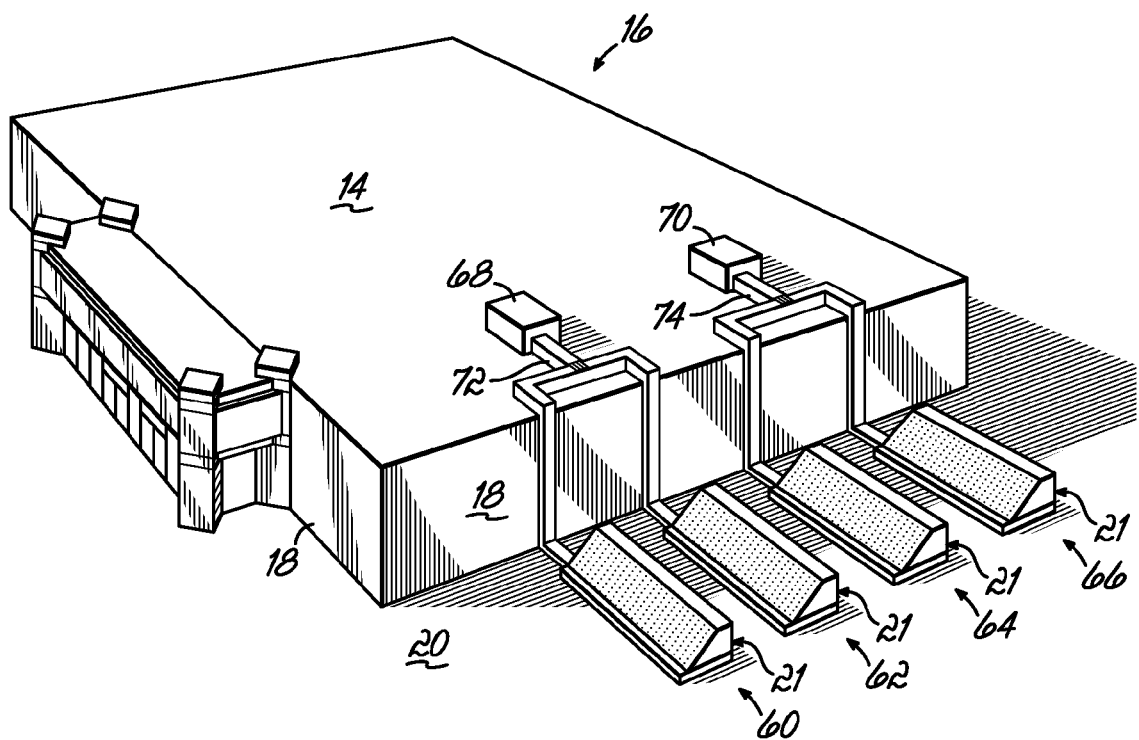
FIG. 4 is a perspective view similar to FIG. 1 of solar heating modules in accordance with an alternative embodiment of the invention mounted adjacent to a building.

With reference to FIG. 4 in which like reference numerals refer to like features in FIGS. 1-3 and in accordance with an alternative embodiment of the invention, a plurality of solar heating modules 60, 62, 64, 66, each substantially identical to the solar heating module 10 (FIGS. 1-3), may be physically divorced from the building 16 as separate structures located on the ground surface 20 near the perimeter of the building 16. Accordingly, a person having ordinary skill in the art will appreciate that one or more solar heating modules 60, 62, 64, 66 may be placed on a support other than the roof 14 of building 16. For example, the solar heating modules 60, 62, 64, 66 may be placed on support slabs in the form of pads located on ground surface 20 adjacent to the building 16 and substantially at ground level. In this embodiment, the solar heating modules 60, 62 are coupled with an HVAC unit 68, which is substantially identical to HVAC unit 46 (FIG. 1), by a duct 72 similar to duct 44 (FIG. 1). Solar heating modules 64, 66 are coupled with an HVAC unit 70, which is also substantially identical to HVAC unit 46 (FIGS. 1-3), by a duct 74 similar to duct 44.

The ducts 72, 74 route the heated air from the solar heating modules 60, 62, 64, 66 up one of the side walls 18 of the building 16 to the HVAC units 68, 70 on roof 14. The ducts 72, 74 may be routed up different side walls 18 of building 16 or, alternatively, the HVAC units 68, 70 may also be placed at ground level on ground surface 20 proximate to building 16. The invention contemplates that one or more solar heating modules may supply heated air to any single HVAC unit associated with building 16. For example, solar module 62 may be omitted in FIG. 4 so that only solar module 60 serves HVAC unit 68.

With reference to FIG. 5 in which like reference numerals refer to like features in FIGS. 1-4 and in accordance with an alternative embodiment of the invention, the heated air from the solar heating modules 60, 62, 64, 66 may be piped or routed directly into the building 16 independent of the presence of HVAC units 68, 70. In this embodiment, each of the solar heating modules 60, 62, 64, 66 is coupled by a respective one of ducts 76, 78, 80, 82 that penetrate directly through one of the side walls 18 of building 16. Ducts 76, 78, 80, 82 communicate with ducts 49 inside the ventilated space of the building 16 for distribution of the heated air to the ventilated space. Each of the ducts 76, 78, 80, 82 may include a damper 77, 79, 81, 83, respectively, communicating with the ambient environment and another internal damper (not shown) similar to damper 56 that can be used to regulate the flow of heated air from the solar heating modules 60, 62, 64, 66 to the ducts 49 inside the space enclosed by building 16.

Figure 6:
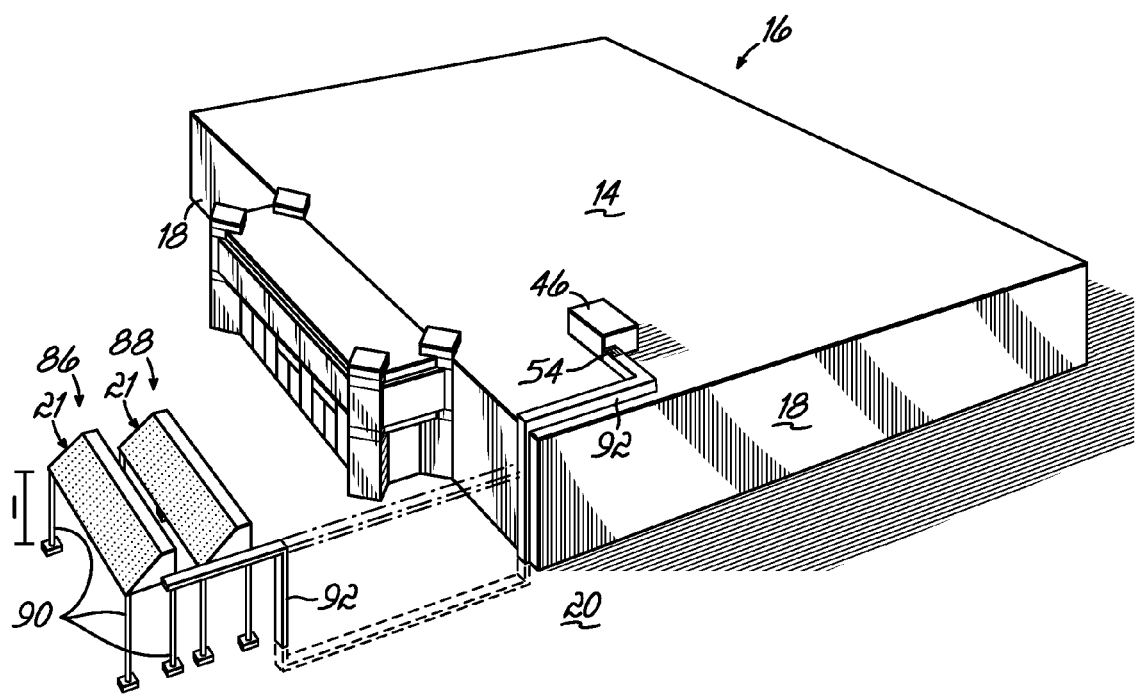
FIG. 6 is a perspective view similar to FIGS. 1, 4 and 5 of solar heating modules in accordance with an alternative embodiment of the invention with an elevated mounting arrangement adjacent to a building.
Figure 7:
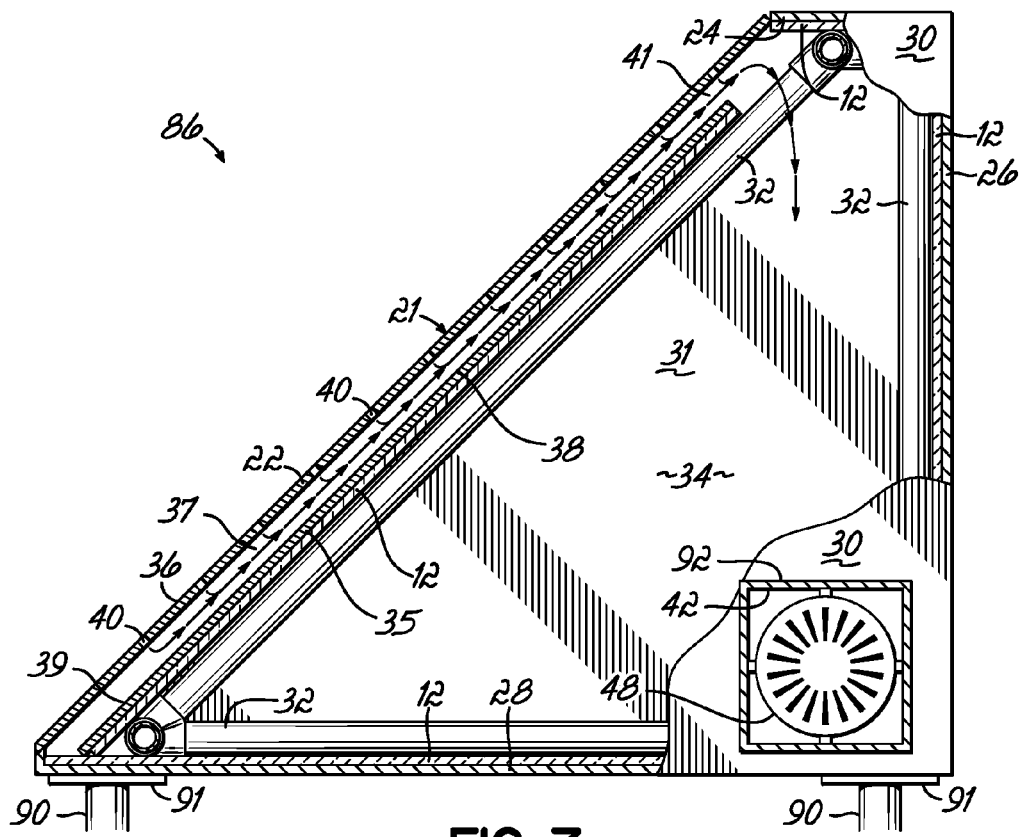
FIG. 7 is a cross-sectional view similar to FIG. 2 of one of the solar heating modules of FIG. 6.

With reference to FIGS. 6 and 7 in which like reference numerals refer to like features in FIGS. 1-5 and in accordance with an alternative embodiment of the invention, a plurality of solar heating modules 86, 88, each substantially identical to the solar heating module 10 (FIGS. 1-3), may be mounted at elevated locations on stilt legs 90 near the building 16. The stilt legs 90, which extend from the ground surface 20 to the enclosure 21 of the respective one of the solar heating modules 86, 88, lift the solar heating modules 86, 88 above the level of the ground surface 20. The solar heating modules 86, 88 are located in proximity to the perimeter of the building 16. The ground surface 20 beneath the solar heating modules 86, 88 may comprise, for example, a parking lot in which motor vehicles (not shown) travel. Accordingly, the length of the stilt legs may be adjusted such that the solar heating modules 86, 88 are at a height above the ground surface 20 adequate to permit the passage of motor vehicles beneath the solar heating modules 86, 88.

The solar heating modules 86, 88 may be physically or mechanically supported on one or more supporting platforms 91 from which the stilt legs 90 extend, in contrast to directly contacting the bottom panel 28 to support the enclosure 21 of each of the modules 86, 88 with the stilt legs 90. The intervening platforms 91 may be relatively small in dimensions, as shown in FIG. 7, or may be large in dimensions so that a single platform 91 is provided between the enclosure 21 and the stilt legs 90. In another alternative embodiment, the platform 91 may be enlarged to dimensions adequate to provide mechanical support both of the solar heating modules 86, 88.

The solar heating modules 86, 88 are coupled with HVAC unit 46 by a duct 92, which may be thermally insulated. The relative separation between the solar heating modules 86, 88 and building 16 may be limited by factors such as heat loss in the duct 92 coupling the solar heating modules 86, 88 and building 16. Over a portion of this separation, duct 92 is routed or buried beneath the ground surface 20 as shown in dashed lines in FIG. 6. This buried configuration does not occlude the open space above the ground surface 20. Alternatively and as shown in dot-dashed lines in FIG. 6, duct 92 may be routed to the building 16 above the ground surface 20 and may be directly coupled through one of the sidewalls 18 with duct 49 (FIG. 10) instead of being coupled with the HVAC unit 46. In this alternative embodiment, the duct 92 may be situated at a height above the ground surface 20 adequate to, for example, permit the passage of motor vehicles and pedestrians.

In this embodiment of the invention, the air outlet 42, which is coupled with duct 92, is defined in the end panel 30 of the enclosure 21, as opposed to the rear panel 26 as shown in FIG. 3. The placement of the air outlet 42 may be modified similarly in other embodiments of the invention.

Figure 8:
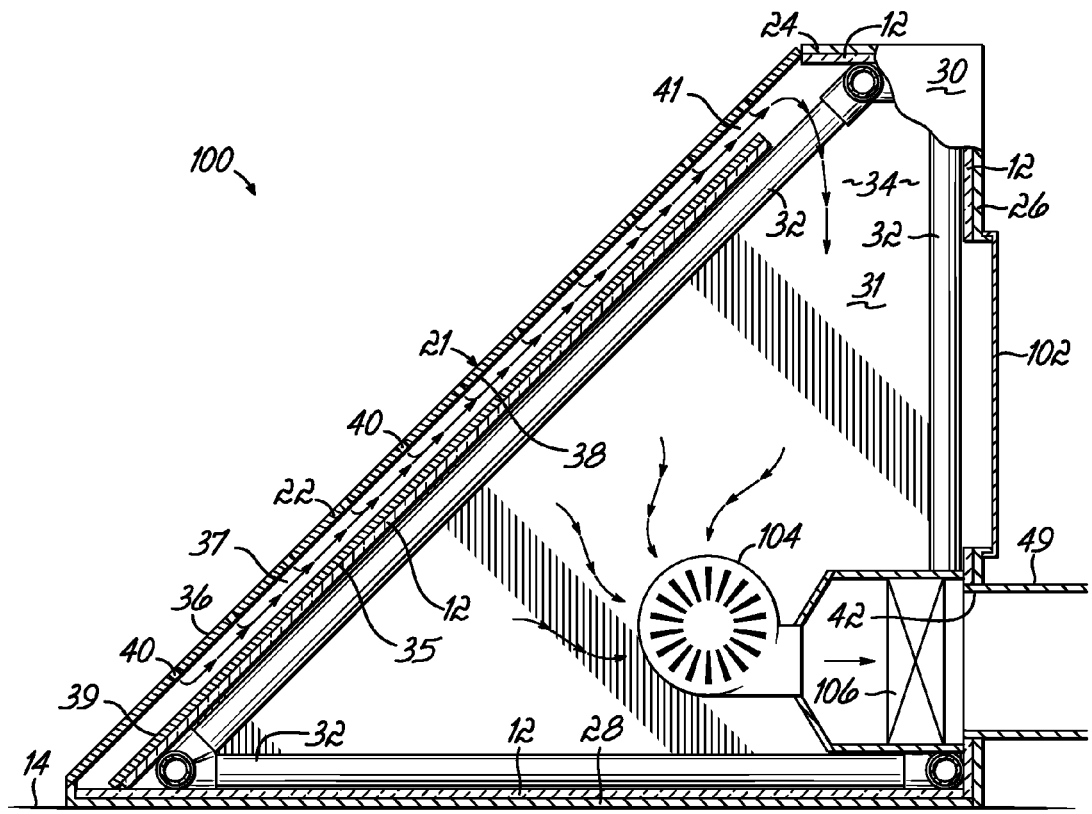
FIGS. 8-10 are cross-sectional views similar to FIG. 2 of solar heating modules in accordance with alternative embodiments of the invention.

With reference to FIG. 8 in which like reference numerals refer to like features in FIG. 3 and in accordance with an alternative embodiment of the invention, the enclosure 21 of a solar heating module 100, which is constructed similar to solar heating module 10 (FIGS. 1-3), includes a door 102. The door 102, which may be configured as a portion of the rear panel 26, has a construction understood by a person having ordinary skill in the art. When the door 102 is closed, the plenum 34 is sealed from the ambient environment but for the passages 40 in the collector panel 22. When the door 102 is opened, the plenum 34 is accessible so that, for example, a maintenance worker can reach operational items, such as a fan or blower 104 and an auxiliary furnace or heating device 106, inside the enclosure 21. The blower 104 operates in a manner similar to blower 48 (FIG. 3), as described hereinabove, as an air-moving device for supplying negative pressure inside the enclosure 21 that suctions outside air through passages 40 into the heating chamber 37 and then suctions the heated air from the heating chamber 37 through delivery slot 41 into the plenum 34. The auxiliary heating device 106 operates to further elevate the temperature of the heated air suctioned from the plenum 34 into duct 49 leading to the ventilated space inside the building 16. The solar heating module 100 with the integral blower 104 and auxiliary heating device 106 is self contained and may be used as a standalone heating unit such that, for example, HVAC unit 46 and blower 48 may be eliminated.

Figure 9:
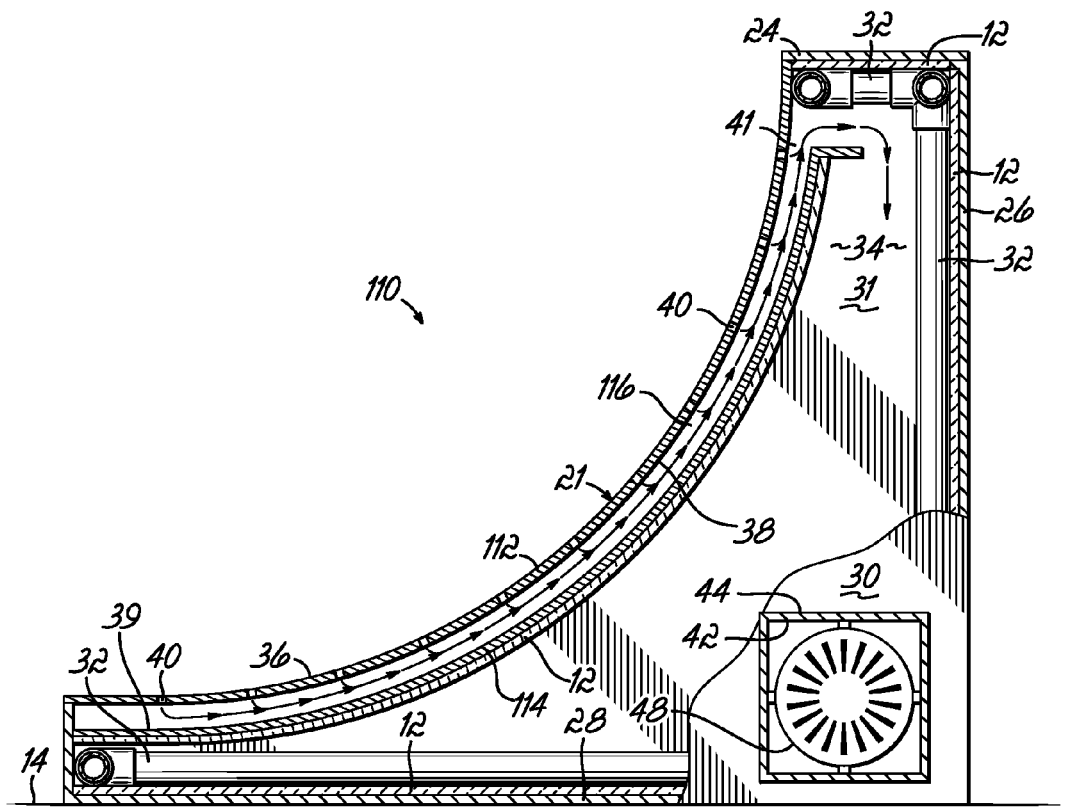

With reference to FIG. 9 in which like reference numerals refer to like features in FIG. 3 and in accordance with an alternative embodiment of the invention, the enclosure 21 of a solar heating module 110, which is constructed similar to solar heating module 10 (FIGS. 1-3), includes a collector panel 112, which is similar to collector panel 22 (FIGS. 1-3), and a interior panel 114, which is similar to interior panel 35 (FIG. 3). A heating chamber 116, which is similar to heating chamber 37 (FIG. 3), is defined between the collector panel 112 and interior panel 114. The collector panel 112 and interior panel 114, as well as the heating chamber 116 defined between collector panel 112 and interior panel 114, are non-planar and, in this particular embodiment, have a concave shape. The collector panel 112 and interior panel are substantially identical in other aspects to collector panel 22 and interior panel 35.

The non-planar shape of the collector panel 112 and interior panel 114 increases the surface area of the collector panel 112, which enhances the collection of solar radiation for heating the air inside the heating chamber 116 and provides flexibility in selecting the attributes of the passages 40 in collector panel 112. This embodiment of the invention permits the collector surface area to be increased without changing the physical footprint of the enclosure 21 and while maintaining the ability to expose the collector panel 112 to impinging solar radiation without extensive shadowing. Of course, the incident angle of the solar radiation varies with the location on the collector panel 112 due to the curvature.

Figure 10:
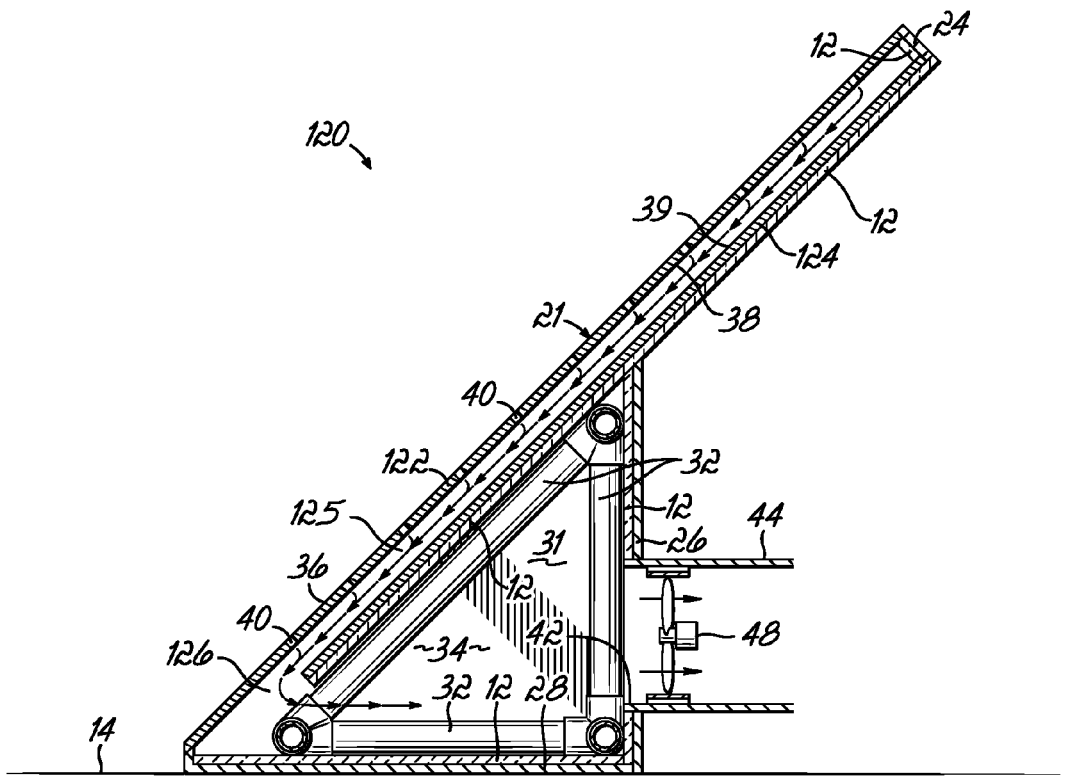

With reference to FIG. 10 in which like reference numerals refer to like features in FIG. 3 and in accordance with an alternative embodiment of the invention, a solar heating module 120, which is constructed similar to solar heating module 10 (FIGS. 1-3), includes a collector panel 122, which is similar to collector panel 22 (FIGS. 1-3), and a partition 124, which is similar to interior panel 35 (FIG. 3). Although a heating chamber 125 similar to heating chamber 37 (FIG. 3) remains defined between the collector panel 122 and partition 124, the collector panel 122 and partition 124 project beyond the rear panel 26 of enclosure 21. In addition, the partition 124 is separated from the floor panel 28 so that the gap or delivery slot 126, through which heated air from heating chamber 37 is transferred to the plenum 34, is proximate to the floor panel 28. The negative pressure supplied by the blower 48 permits flexibility in locating the delivery slot 126 for the heated air inside the enclosure 21.

The solar heating module 120 omits the top panel 24 (FIG. 2) so that the rear panel 26 directly intersects the collector panel 22 at an angled apex to close the enclosure 21. The bottom panel 26 is shortened to accommodate the omission of the top panel 24.

As appreciated by a person having ordinary skill in the art, any of the various constructions of the solar heating modules 100 (FIG. 8), 110 (FIG. 9), and 120 (FIG. 10) may be equivalently substituted for the construction of solar heating module 10 (FIGS. 1-3), the solar heating modules 60, 62, 64, 66 (FIG. 4), and the solar heating modules 86, 88 (FIGS. 6, 7). Accordingly, the location of the module relative to the building 16 (i.e., rooftop, ground, elevated, etc.) may be substantially independent of the module construction.

While the invention has been illustrated by a description of various embodiments and while these embodiments have been described in considerable detail, it is not the intention of the applicant to restrict or in any way limit the scope of the appended claims to such detail. Additional advantages and modifications will readily appear to those skilled in the art. Thus, the invention in its broader aspects is therefore not limited to the specific details, representative apparatus and method, and illustrative example shown and described. Accordingly, departures may be made from such details without departing from the spirit or scope of applicant's general inventive concept.

What is claimed is:

1. A solar heating system for mounting on a support structure, the solar heating system comprising:
a solar heating module with an enclosure including a plurality of panels, said panels including a floor panel configured to be physically mounted to the support structure, a top panel, spaced apart from said floor panel a collector panel extending from said floor panel to said top panel, and an interior panel disposed at least partially inside the enclosure between said floor panel and said collector panel, said collector panel separated from said interior panel to define a heating chamber between said interior panel and said collector panel, said interior panel located between said collector panel and said floor panel to define a plenum between said interior panel and said floor panel, said interior panel having a first end contacting one of said floor panel or said top panel and a second end separated from the other of said floor panel or said top panel to define a delivery slot coupling said heating chamber in fluid communication with said plenum, said collector panel including a first surface bordering an ambient environment of said enclosure, a second surface bordering said heating chamber, and a plurality of passages extending from said first surface of said collector panel to said second surface of said collector panel, said panels of said enclosure having an arrangement such that said collector panel is capable of being exposed to solar radiation and heated by the solar radiation, and said collector panel configured to transfer air from the ambient environment through said passages to said heating chamber and to transfer heat from said collector panel to the air in said heating chamber to form heated air;
an air outlet from said plenum defined in one of said panels of said enclosure; and
an air-moving device coupled with said air outlet, said air-moving device adapted to apply a negative pressure in said heating chamber effective for drawing the air from the ambient environment through said passages into said heating chamber and for withdrawing the heated air from said heating chamber through said delivery opening to said plenum for subsequent removal through said air outlet.

2. The solar heating system of claim 1 further comprising:
a duct coupled with said air outlet; and
a first damper associated with said duct, said first damper having an opened condition in which said duct communicates with the ambient environment and a closed condition in which the duct is sealed.

3. The solar heating system of claim 2 further comprising:
a HVAC unit having an air inlet coupled by said duct with said air outlet.

4. The solar heating system of claim 3 wherein said air inlet of said HVAC unit includes a second damper having an opened condition in which said duct communicates with said air inlet and a closed condition in which said air inlet is blocked.

5. The solar heating system of claim 1 further comprising:
a layer of a thermally insulating material on at least one of said panels, said thermally insulating material having a lower thermal conductivity than a material forming said at least one of said panels.

6. The solar heating system of claim 5 wherein the support structure is a roof of a building, and said layer is disposed between the roof and said floor panel.

7. The solar heating system of claim 1 further comprising:
a layer of a thermally insulating material on said interior panel, said thermally insulating material having a lower thermal conductivity than a material forming said interior panel.

8. The solar heating system of claim 1 wherein said collector panel is substantially planar.

9. The solar heating system of claim 1 wherein said collector panel is concave.

10. The solar heating system of claim 1 wherein said enclosure further comprises:
a phase change material adapted to store heat energy transferred from the air and to release the heat energy when a temperature of the air in said heating chamber is lower than a temperature of the phase chamber material.

11. The solar heating system of claim 1 wherein said top panel is generally parallel to said floor panel, said panels further comprise a rear panel extending between said top panel and said floor panel, said collector panel extends at an angle between said top panel and said floor panel, and said top panel extends between said rear panel and said collector panel.

12. The solar heating system of claim 11 wherein said collector panel and said interior panel project above said top panel and partially overhang said top panel.

13. The solar heating system of claim 12 wherein said delivery opening is defined as a slot between said floor panel and said interior panel.

14. The solar heating system of claim 11 wherein said delivery opening is defined as a slot between said top panel and said interior panel.

15. The solar heating system of claim 11 further comprising:
a heating unit within said enclosure; and
a door covering an access opening in said rear panel.

16. An architectural structure comprising:
a building having a roof, a plurality of side walls, and a ventilated space;
a solar heating module with an enclosure including a plurality of panels, said panels including a floor panel configured to be physically mounted to the support structure, a top panel, spaced apart from said floor panel a collector panel extending from said floor panel to said top panel, and an interior panel disposed at least partially inside the enclosure between said floor panel and said collector panel, said collector panel separated from said interior panel to define a heating chamber between said interior panel and said collector panel, said interior panel located between said collector panel and said floor panel to define a plenum between said interior panel and said floor panel, said interior panel having a first end contacting one of said floor panel or said top panel and a second end separated from the other of said floor panel or said top panel to define a delivery slot coupling said heating chamber in fluid communication with said plenum, said collector panel including a first surface bordering an ambient environment of said enclosure, a second surface bordering said heating chamber, and a plurality of passages extending from said first surface to said second surface, said panels of said enclosure having an arrangement such that said collector panel is capable of being exposed to solar radiation and heated by the solar radiation, and said collector panel configured to transfer air from the ambient environment through said passages to said heating chamber and to transfer heat from said collector panel to the air in said heating chamber to form heated air;

an air outlet from said plenum defined in one of said panels of said enclosure; and an air-moving device coupled with said air outlet, said air-moving device adapted to apply a negative pressure in said heating chamber effective for drawing the air from the ambient environment through said passages into said heating chamber and for withdrawing the heated air from said heating chamber through said delivery opening to said plenum for subsequent removal through said air outlet to said ventilated space of said building.

17. The architectural structure of claim 16 wherein said support structure is said roof.

18. The architectural structure of claim 16 wherein said support structure is a ground surface proximate to said building.

19. The architectural structure of claim 16 wherein said support structure is a plurality of stilt legs extending between said enclosure and a ground surface.

20. The architectural structure of claim 19 further comprising:
a duct coupling said ventilated space of said building with said air outlet of said enclosure.

21. The architectural structure of claim 20 wherein a portion of said duct is buried beneath the ground surface.

22. The architectural structure of claim 19 further comprising:
a HVAC unit having an air inlet; and
a duct coupling said air inlet of said HVAC unit with said air outlet of said enclosure.

23. The architectural structure of claim 22 wherein a portion of said duct is buried beneath the ground surface.

24. The architectural structure of claim 16 further comprising:
a HVAC unit having an air inlet; and
a duct coupling said air inlet of said HVAC unit with said air outlet of said enclosure.

25. The architectural structure of claim 16 further comprising:
a duct coupling said ventilated space of said building with said air outlet of said enclosure.

26. The solar heating system of claim 10 wherein said interior panel contains said phase change material.

* * * * *

UNITED STATES PATENT AND TRADEMARK OFFICE
CERTIFICATE OF CORRECTION

PATENT NO. : 7,677,243 B2  Page 1 of 1
APPLICATION NO. : 11/625662
DATED : March 16, 2010
INVENTOR(S) : James Patrick McClendon It is certified that error appears in the above-identified patent and that said Letters Patent is hereby corrected as shown below:

In column 3, line 61, after "is", insert --the--.

In column 5, line 11, after "may", insert --be--.

In claim 1, column 11, line 28, after "floor panel", insert --,--.

In claim 16, column 12, line 60, after "floor panel", insert --,--.

Signed and Sealed this

Third Day of August, 2010

David J. Kappos
*Director of the United States Patent and Trademark Office*